United States Patent
Teo (10) Patent No.: US 12,340,826 B2
(45) Date of Patent: Jun. 24, 2025

(54) HARD DISK DRIVE SLIDER COATING FOR SUSPENSION MECHANICAL IMPROVEMENT

(71) Applicant: Western Digital Technologies, Inc., San Jose, CA (US)

(72) Inventor: Kia Moh Teo, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/373,034

(22) Filed: Sep. 26, 2023

(65) Prior Publication Data

US 2025/0104732 A1 Mar. 27, 2025

(51) Int. Cl.
G11B 5/48 (2006.01)

(52) U.S. Cl.
CPC .......... *G11B 5/4826* (2013.01); *G11B 5/4833* (2013.01)

(58) Field of Classification Search
None
See application file for complete search history.

(56) References Cited

U.S. PATENT DOCUMENTS

| | | | |
|---|---|---|---|
| 5,530,606 A | 6/1996 | Baasch et al. | |
| 5,969,904 A | 10/1999 | Alt et al. | |
| 7,593,190 B1 | 9/2009 | Thornton et al. | |
| 8,681,594 B1 * | 3/2014 | Shi ...................... | G11B 5/6088 369/112.27 |
| 9,073,782 B2 * | 7/2015 | Shmueli .............. | C09D 5/1618 |
| 9,123,374 B1 * | 9/2015 | Tohmon ............... | G11B 5/6088 |
| 9,190,086 B1 | 11/2015 | Ee et al. | |
| 9,343,095 B2 | 5/2016 | Takei et al. | |
| 9,558,768 B1 * | 1/2017 | Tsuchiya ............. | G11B 5/4826 |
| 9,792,936 B1 | 10/2017 | Kumar et al. | |
| 10,614,841 B1 | 4/2020 | Hosoi et al. | |
| 10,720,179 B1 * | 7/2020 | Sedklang ............ | G11B 5/4826 |
| 11,056,137 B1 * | 7/2021 | Teo ...................... | G11B 25/043 |
| 11,069,375 B1 * | 7/2021 | Chawalitsittikul .. | G11B 5/5521 |
| 11,508,402 B1 * | 11/2022 | Pokaipisit ........... | G11B 5/4826 |

(Continued)

FOREIGN PATENT DOCUMENTS

JP 2007133966 A 5/2007

OTHER PUBLICATIONS

Qian, W. et al., Crown Sensitivity of the Magnetic Recording Head Gimbal Assembly Bonded by a Viscoelastic Adhesive, Mechanics of Time-Dependent Materials, Published: Dec. 1998, vol. 2, pp. 371-387, Springer Link.

*Primary Examiner* — William J Klimowicz
(74) *Attorney, Agent, or Firm* — John D. Henkhaus (57) ABSTRACT

An assembly configured for a hard disk drive includes a head slider having a suspension face and a recording medium face opposing the suspension face, where the slider houses a read-write transducer at or near a trailing edge (TE) face opposing a LE face, and a suspension assembly comprising a flexure having a standoff structure extending from a main planar body of the flexure, to which the suspension face of the slider is adhered. A first portion of the suspension face of the slider is coated with an anti-reflective coating (ARC) extending at least to a farthest portion, in a direction of the LE face, of the standoff structure of the flexure. An adhesive attaches the head slider to the flexure and is positioned to interface in its entirety with at least a portion of the ARC.

13 Claims, 8 Drawing Sheets

(56) References Cited

U.S. PATENT DOCUMENTS

| | | | |
|---|---|---|---|
| 2008/0037174 A1* | 2/2008 | Yao | G11B 5/4826 |
| 2012/0008470 A1* | 1/2012 | Shimazawa | G11B 5/314 |
| 2013/0279310 A1* | 10/2013 | Zhong | G11B 5/40 |
| | | | 427/127 |
| 2015/0364899 A1* | 12/2015 | Tatah | G11B 5/6088 |
| | | | 372/20 |
| 2016/0247527 A1* | 8/2016 | Cheng | G11B 5/314 |
| 2022/0343949 A1* | 10/2022 | Punchanavanit | G11B 21/21 |

* cited by examiner

COAT WITH AN ANTI-REFLECTIVE COATING (ARC) A FIRST PORTION OF A SUSPENSION FACE OF A HEAD SLIDER HAVING A SLIDER BODY HAVING A LEADING EDGE (LE) FACE, THE SUSPENSION FACE, AND A RECORDING MEDIUM FACE OPPOSING THE SUSPENSION FACE
802

ADHERE THE HEAD SLIDER TO A SUSPENSION ASSEMBLY COMPRISING A FLEXURE HAVING A STANDOFF STRUCTURE TO WHICH THE SUSPENSION FACE OF THE SLIDER IS ADHERED, WHEREIN THE ARC IS POSITIONED TO EXTEND AT LEAST TO A FARTHEST POSITION, IN A DIRECTION TOWARD THE LE FACE, OF THE STANDOFF STRUCTURE OF THE FLEXURE
804

HARD DISK DRIVE SLIDER COATING FOR SUSPENSION MECHANICAL IMPROVEMENT

FIELD OF EMBODIMENTS

Embodiments of the invention may relate generally to hard disk drives, and particularly to approaches to improving the attachment and mobility of a head slider.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) has led to the necessary development and implementation of secondary and even tertiary actuators for improved head positioning through relatively fine positioning, in addition to a primary voice coil motor (VCM) actuator which provides relatively coarse positioning. Some HDDs employ micro- or milli-actuator designs to provide second and/or third stage actuation of the recording head to enable more accurate positioning of the head relative to the recording tracks. Milli-actuators may be broadly classified as actuators that move the entire front end of the suspension: spring, load beam, flexure and slider, and are typically used as second stage actuators. Micro-actuators (or "microactuators") may be broadly classified as actuators that move (e.g., rotate) only the slider, moving it relative to the suspension and load beam, or move only the read-write element relative to the slider body. A microactuator may be used solely in conjunction with a first stage actuator (e.g., VCM), or in conjunction with a first stage actuator and a second stage actuator (e.g., milli-actuator) for more accurate head positioning. The terms "microactuator" and "secondary actuator" and "dual stage actuator" are used herein to refer generally to a relatively fine-positioning actuator (e.g., technically, either secondary or tertiary) used in conjunction with a primary relatively coarse-positioning actuator, such as a VCM actuator in the context of an HDD. Piezoelectric (PZT) based and capacitive micro-machined transducers are two types of microactuators that have been developed for use with HDD sliders. However, mechanical tolerances within a dual stage actuator system are historically tight.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to improving the attachment and mobility of a head slider in a hard disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention.

However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that secondary and tertiary actuators are under development and implementation for improved read-write head positioning through relatively fine positioning, and that such dual stage actuator systems necessitate tight mechanical tolerances throughout the pertinent slider-suspension components. Furthermore and as alluded to, increasing the storage capacity of hard disk drives (HDDs) is one of the on-going goals of HDD technology evolution. In one form, this goal manifests in increasing the areal density, such as through the use of heat-assisted magnetic recording (HAMR). With HAMR, a laser light source (e.g., a laser diode) is integrated onto a magnetic recording head slider. Laser diodes are fragile and typically not suitable for direct mechanical attachment to the head slider. Therefore, a submount assembly may be used to mount the laser diode to the slider body. With the addition of such HAMR components to an otherwise conventional head slider, additional mechanical tolerances and constraints are likewise introduced into slider-suspension designs.

Figure 1:
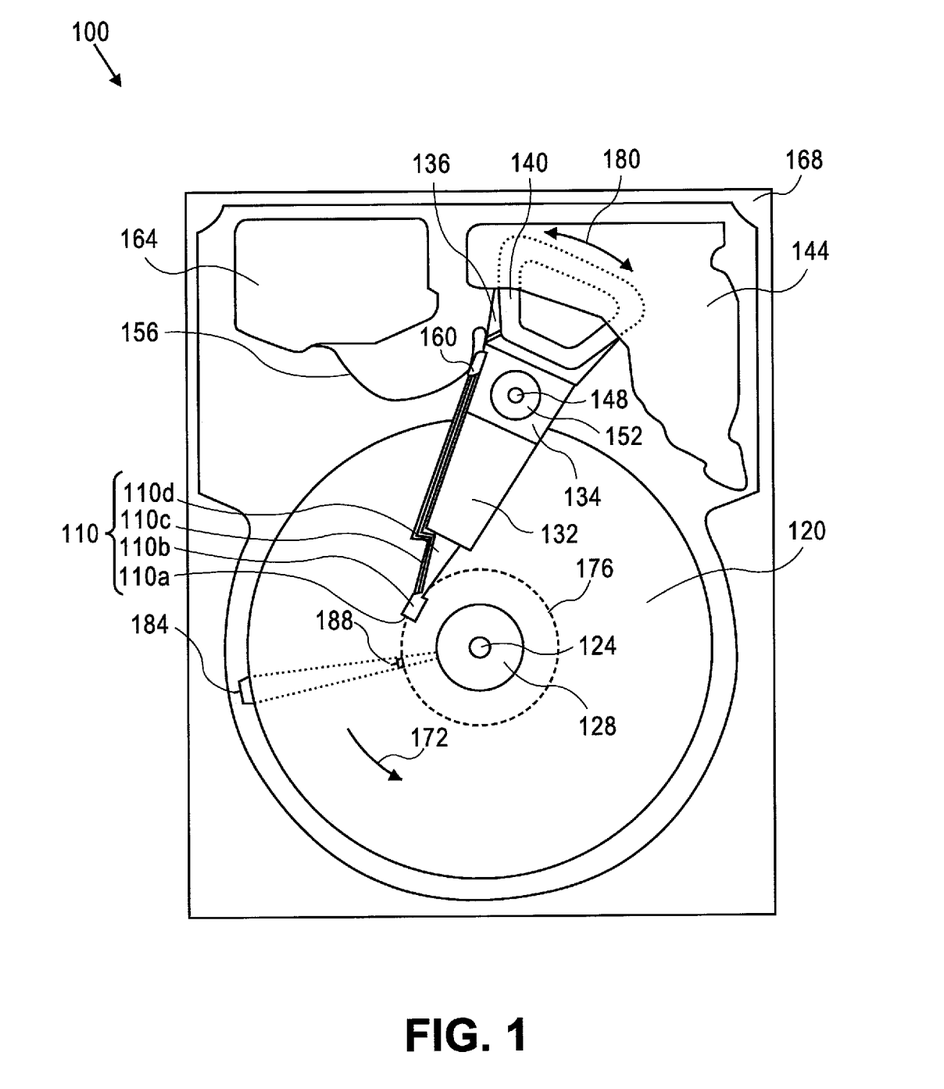
FIG. 1 is a plan view illustrating a hard disk drive, according to an embodiment.
Figure 2:
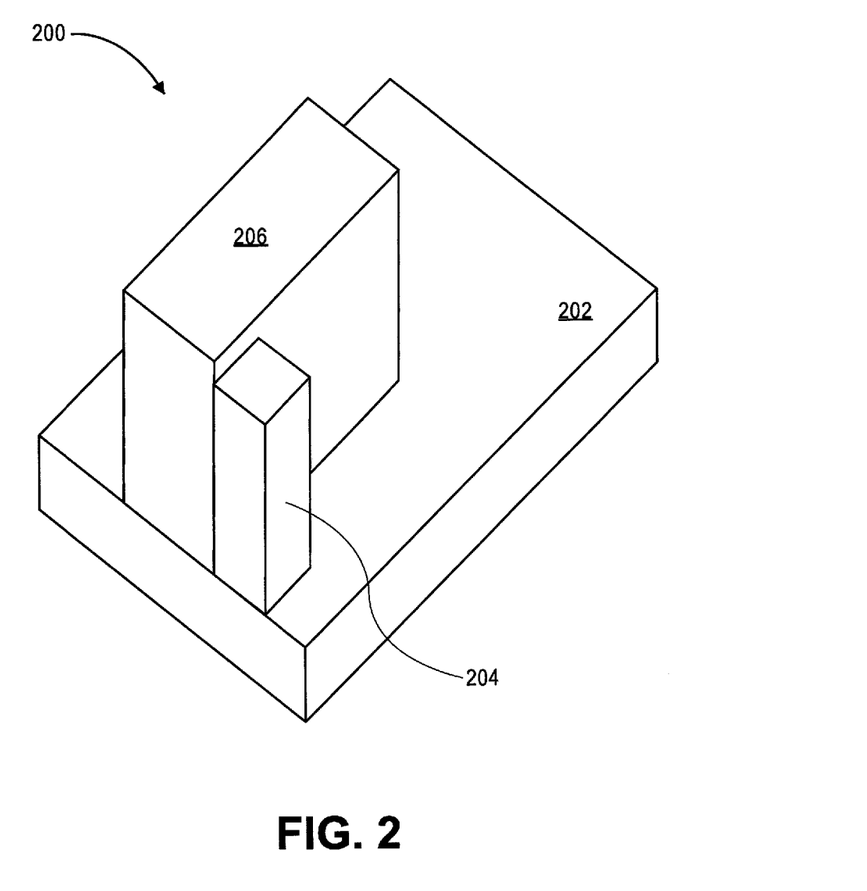
FIG. 2 is a perspective view illustrating a heat-assisted magnetic recording (HAMR) head slider coupled with a laser module, according to an embodiment.

FIG. 2 is a perspective view illustrating a HAMR head slider coupled with a laser module, according to an embodiment. HAMR head slider assembly 200 comprises a laser light source 204 (or simply "laser 204"), such as a semiconductor laser or laser diode, coupled with or integrally-formed with a submount 206, for mounting to a HAMR head slider 202 and utilized for locally heating magnetic media (see, e.g., recording medium 120 of FIG. 1). The component that is a combination of the laser 204 and the submount 206 is often collectively referred to as a "laser module" or a chip-on-submount assembly (CoSA) block or a CoSA laser module. For a non-limiting example, a HAMR laser module comprising laser 204 and submount 206 may be mounted on or near the backside (e.g., the suspension side opposite the air bearing surface, or ABS) of a HAMR head slider 202. This localized heating of the magnetic media 120 momentarily reduces the local coercivity of the magnetic media 120, which greatly facilitates writing to the media 120.

Figure 3A:
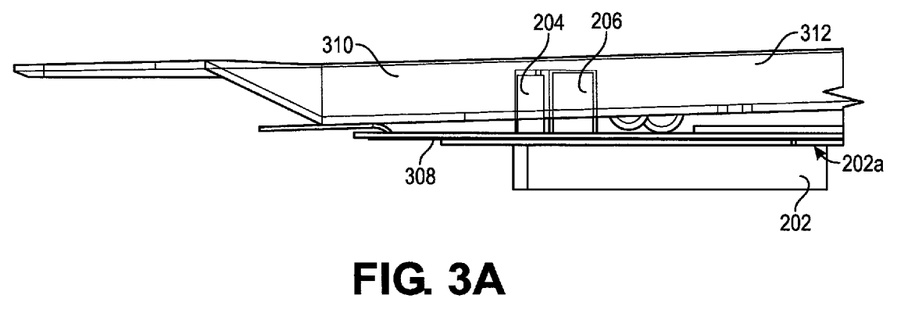
FIG. 3A is a side view illustrating a heat-assisted magnetic recording (HAMR) chip-on-submount assembly (CoSA), according to an embodiment.
Figure 3B:
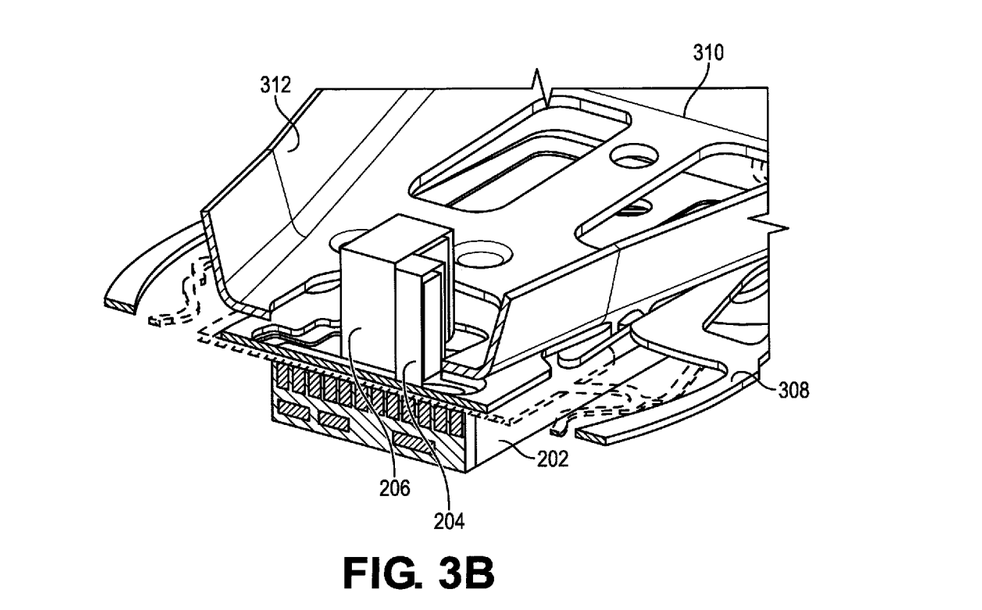
FIG. 3B is a cross-sectional perspective view illustrating the HAMR CoSA of FIG. 3A, according to an embodiment.

FIG. 3A is a side view illustrating a heat-assisted magnetic recording (HAMR) chip-on-submount assembly (CoSA), and FIG. 3B is a cross-sectional perspective view illustrating the HAMR CoSA of FIG. 3A, both according to an embodiment. For a HAMR design, the submount 206 is typically bonded to a flexure bonding surface 202a of the slider 202, whereby the emitting surface of the corresponding laser 204 faces the flexure bonding surface 202a of the slider 202. An orifice is typically formed in both the flexure 308 (depicted in part in phantom, for context, while allowing clarity to the load beam assemblies) and the load beam 310, and the laser module is passed through these orifices for coupling with the slider 202. A longitudinal side rail 312 is typically fabricated on each lateral side of the load beam 310 by bending the sides of the load beam 310.

Figure 4A:
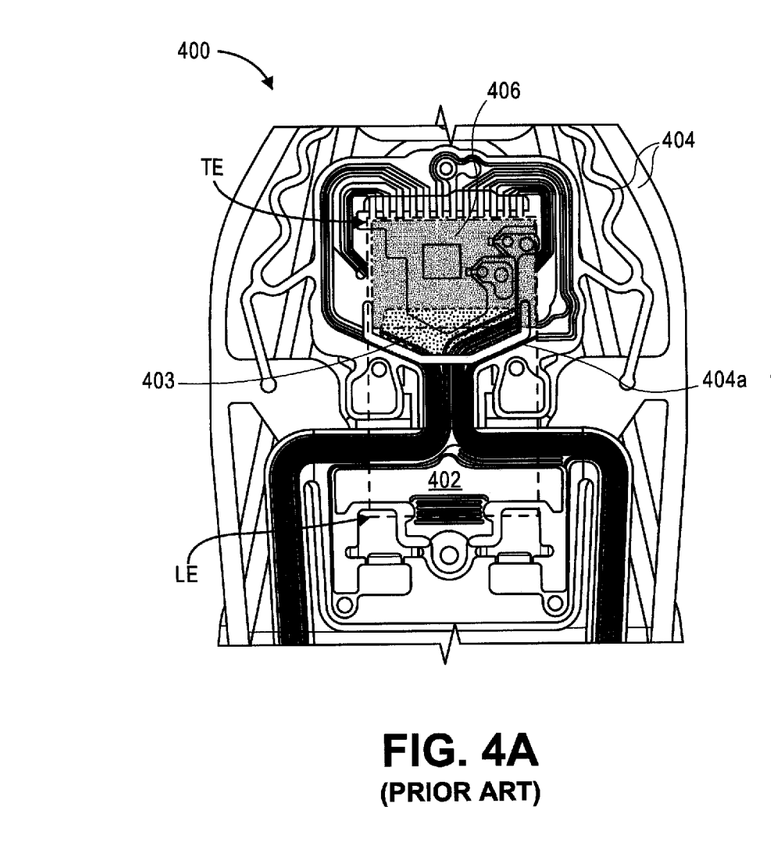
FIG. 4A is a top view illustrating a known slider-flexure assembly, according to an embodiment.

FIG. 4A is a top view illustrating a known slider-flexure assembly. Assembly 400 comprises a head slider 402 (or simply "slider 402", shown here in phantom form for clarity) adhesively coupled to a suspension flexure 404 ("flexure 404") via an adhesive 403. Flexure 404 includes an extending structure 404a (which may also be referred to as a stud, "standoff feature", or "standoff 404a") extending from a main planar structure or body of the flexure 404 (e.g., from a tongue portion of the flexure 404) and to which a suspension face of the slider 402 is adhered. Historically, to facilitate the use of machine vision (and/or computer vision) technology for the assembly of a HAMR slider, such as for mounting the CoSA (see, e.g., laser 204 and submount 206 of FIG. 2) onto the slider 402 surface, certain visual identification and/or targeting features are established on the slider 402 HAMR mounting surface. At least in part to assist the machine in "seeing" or reading such features, an anti-reflective coating (ARC) 406 is applied to a portion of the surface of slider 402, because the native surface of the slider 402 is extremely shiny as it is typically composed of AlTiC (aluminum-titanium-carbide). Thus, the manufacturing features are established on the ARC 406 surface rather than the slider 402 surface. However, one challenge with or detriment of applying the ARC 406 having the depicted footprint and within the manufacturing tolerances is that the ARC 406 may inconveniently intersect with the standoff 404a such that the slider 402 may not mount sufficiently accurately, stably, and consistently. For example, note that the outer border of ARC 406 may or may not fully and stably interface with standoff 404a structure at all points, and that an edge of ARC 406 intersects awkwardly with the adhesive 403. For example, the slider 402 may be mounted with an undesirable tilt rather than sufficiently parallel with the flexure 404. Consequently, the clearance between the slider 402 and the flexure 404 may be inadequate for prohibiting/inhibiting the slider 402 from undesirably contacting the flexure 404, which may in turn inhibit the dual actuator system (e.g., PZT microactuator) from operating accurately and effectively and unencumbered by slider-flexure contact.

Extended Slider Coating Improvement

Figure 4B:
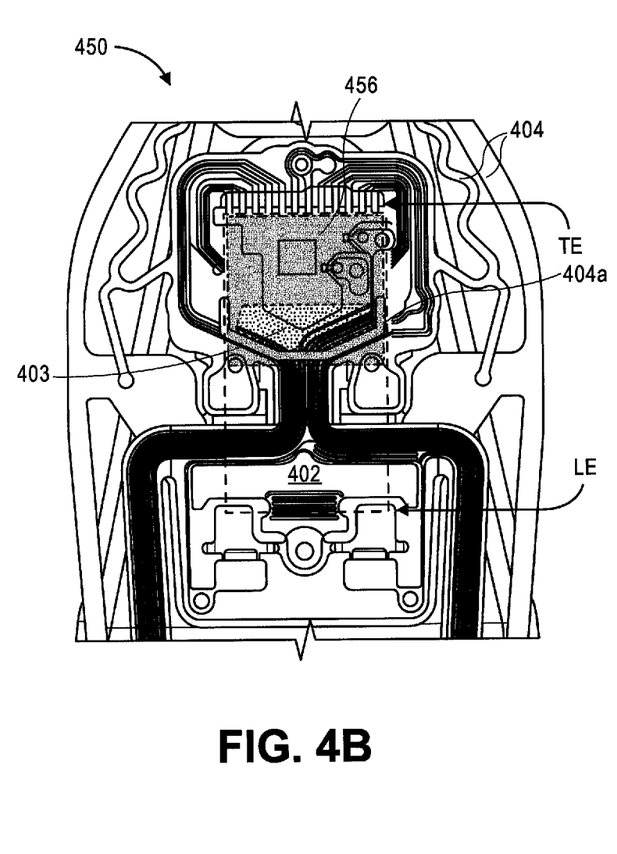
FIG. 4B is a top view illustrating an enhanced slider-flexure assembly, according to an embodiment.

FIG. 4B is a top view illustrating an enhanced slider-flexure assembly, according to an embodiment. Assembly 450 comprises the head slider 402 (shown here in phantom form for clarity) adhesively coupled to the suspension flexure 404 ("flexure 404") via adhesive 403. Slider 402 has a slider body having a leading edge (LE) face, a suspension face/surface facing the flexure 404, and a recording medium face/surface opposing the suspension face, and houses a read-write transducer (see, e.g., magnetic read-write head 110a of FIG. 1) at or near a trailing edge (TE) face opposing the LE face of the slider 402 body. Here too flexure 404 includes the extending structure 404a (which may also be referred to as "standoff 404a") extending from a main planar structure or body of the flexure 404 (e.g., from a tongue portion of the flexure 404) and to which a suspension face of the slider 402 is adhered. According to an embodiment, an anti-reflective coating (ARC) 456 is applied to an extended, larger portion of the surface of slider 402 than with the assembly 400 of FIG. 4A. As such, slider 402 is coated with ARC 456 extending at least to the farthest portion, in the LE direction, of the standoff 404a of the flexure 404. According to an embodiment and as depicted, ARC 456 extends along the suspension face substantially from the TE face of slider 402 and ending just beyond the standoff 404a of the flexure 404. According to an embodiment the ARC 456 is configured to physically interface with a majority of a mating surface of the standoff 404a of the flexure 404. According to an embodiment the ARC 456 is configured to physically interface with the entire adhesive 403 wetting area of the flexure 404. Stated otherwise, adhesive 403 attaches the slider 402 to the flexure 404 such that the adhesive 403 is positioned to interface, in the entirety of its footprint, with at least a portion of the ARC 456. Note that the coating material referred to as anti-reflective coating (ARC) 456 may vary from implementation to implementation and, as such, a slider coating material other than an anti-reflective material (e.g., typically some composition of silicon oxide, or tantalum oxide, or platinum, or titanium, or the like) may be applied to the slider 402 for the purposes described herein.

Figure 5:
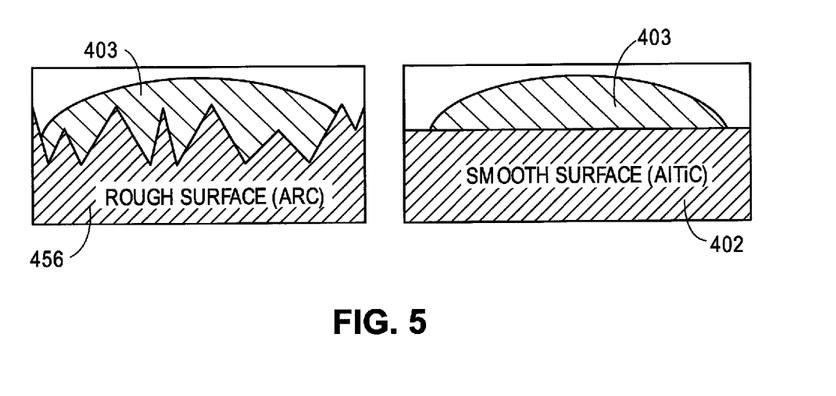
FIG. 5 is a side view diagram illustrating a slider-adhesive interface for an uncoated smooth surface versus a coated rough surface, according to an embodiment.

One expected benefit of extending the ARC 456 footprint as described and depicted is that the adhesion (e.g., shear) strength is increased, at least in part because the surface roughness of the ARC 456 (e.g., Ra=0.974 nm for a silicon oxide) is greater than the surface roughness of the underlying AlTiC (e.g., Ra=0.440 nm) of the slider 402 body. FIG. 5 is a side view diagram illustrating a slider-adhesive interface for an uncoated smooth surface versus a coated rough surface, according to an embodiment. The rough surface, as exemplified by application of the ARC 456, effectively presents more surface area for the adhesive 403 for adhesion purposes than does the uncoated smooth surface of the AlTiC slider 402. A study of the shear strength of the adhesive bond between adhesive 403 and the ARC 456 rough surface showed an approximately 55% increase as compared with the adhesive bond between adhesive 403 and the slider 402 smooth AlTiC surface.

Figure 6A:
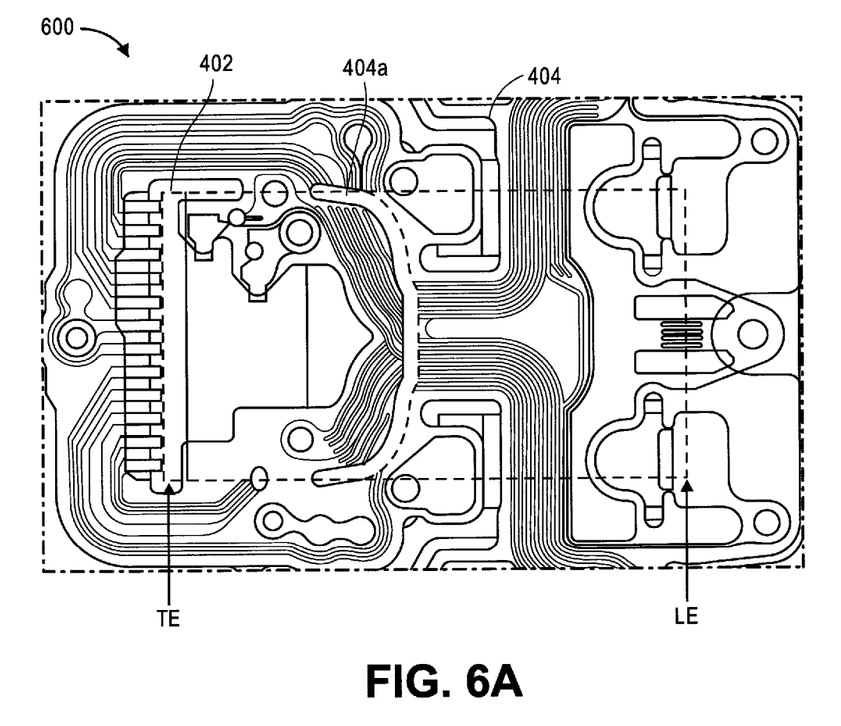
FIG. 6A is a top view illustrating a critical area of clearance for a slider-flexure assembly, according to an embodiment.
Figure 6B:
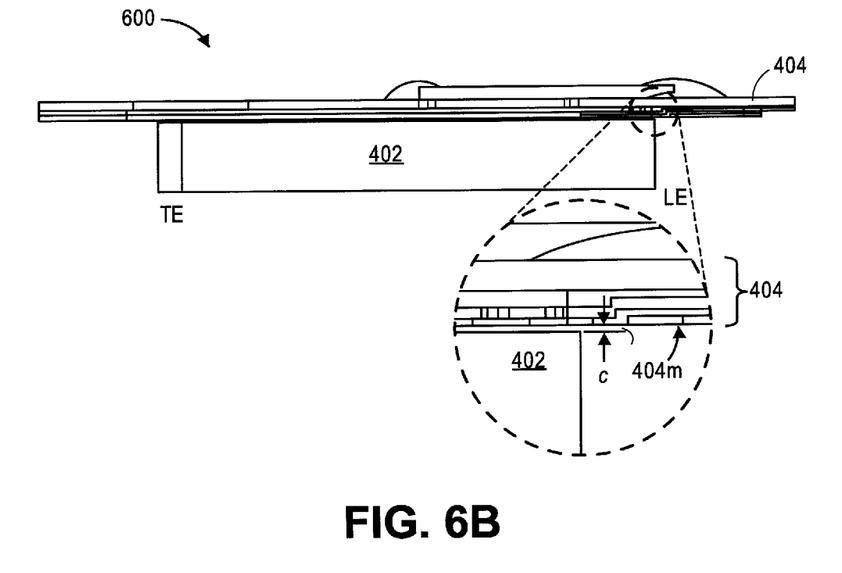
FIG. 6B is a side view illustrating the area of clearance for a slider-flexure assembly, according to an embodiment.

FIG. 6A is a top view illustrating a critical area of clearance for a slider-flexure assembly, and FIG. 6B is a side view illustrating the area of clearance for a slider-flexure assembly, both according to an embodiment. Assembly 600 is shown comprising a slider 402 (shown here in phantom form for clarity) coupled with a flexure 404 having an extending structure, or standoff 404a, extending therefrom from a main planar body 404m of the flexure 404, to form a mounting support for the slider 402. These components are the same as or similar to in functionality to the like components of FIG. 4B.

For resistance (friction) free dual stage actuator (e.g., PZT microactuator) stroke rotation, clearance (c) is generally desired between flexure 404 and the LE half of slider 402. The area shown corresponding to the footprint of the slider 402 is considered an area of critical clearance, whereby sufficient clearance preferably exists at all times according to a given design configuration. For example, a typical design clearance between the slider 402 and corresponding flexure 404 is only around 5 μm (micrometer, or micron) under ideal conditions. However, such clearance is highly dependent on the localized flexure cover overlay (or "coverlay") feature height and slider attachment bonding parallelism (e.g., between slider and flexure) control. Furthermore in the context of a HAMR slider, a HAMR slider is relatively long (e.g., possibly around 50% longer than a conventional slider, in the TE-LE direction) with a very limited bonding area, which increases slider to flexure contact risk (e.g., parallelism control margin is approximately 1.5 times more stringent than with conventional non-HAMR slider). Thus, to reiterate, a slight slider bonding attachment tilt toward the flexure LE could cause contact and create a dynamic performance abnormality/instability issue. Furthermore, the presence of the HAMR CoSA further limits the slider adhesion (e.g., gluing) area.

Figure 6C:
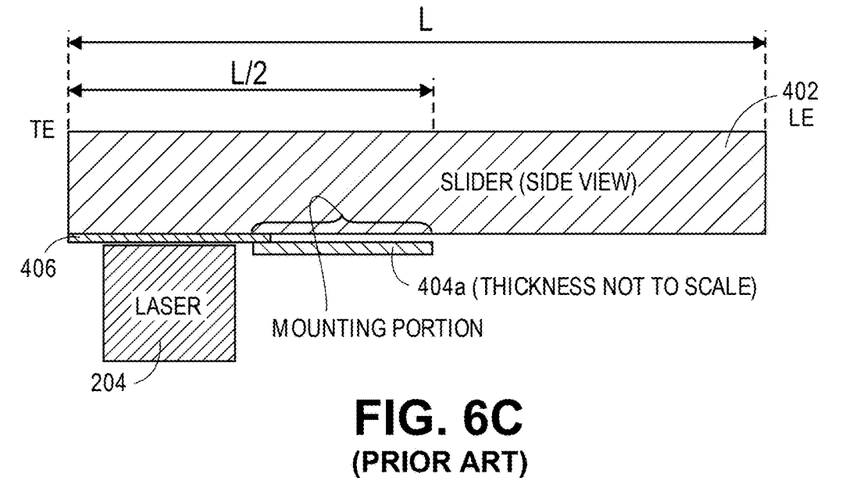
FIG. 6C is a side view illustrating an ideal slider attachment for the known slider-flexure assembly of FIG. 4A.
Figure 6D:
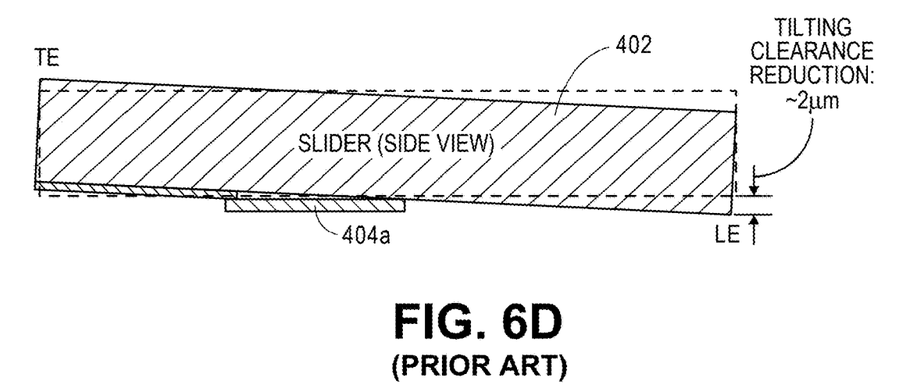
FIG. 6D is a side view illustrating an unstable slider attachment for the known slider-flexure assembly of FIG. 4A.

FIG. 6C is a side view illustrating an ideal slider attachment for the known slider-flexure assembly of FIG. 4A, and FIG. 6D is a side view illustrating an unstable slider attachment for the known slider-flexure assembly of FIG. 4A. Here, the ARC 406 extends only about 30% or so along the length of the slider 402 from the TE and, therefore, does not entirely cover the positional area of standoff 404a. Thus, as generally depicted, there is very limited overlap of ARC 406 with standoff 404a for achieving stable slider attachment parallelism control. Thus, the slider 402 attachment may tilt as depicted in FIG. 6D and, consequently, be prone to undesirable contact with flexure 404.

Figure 7:
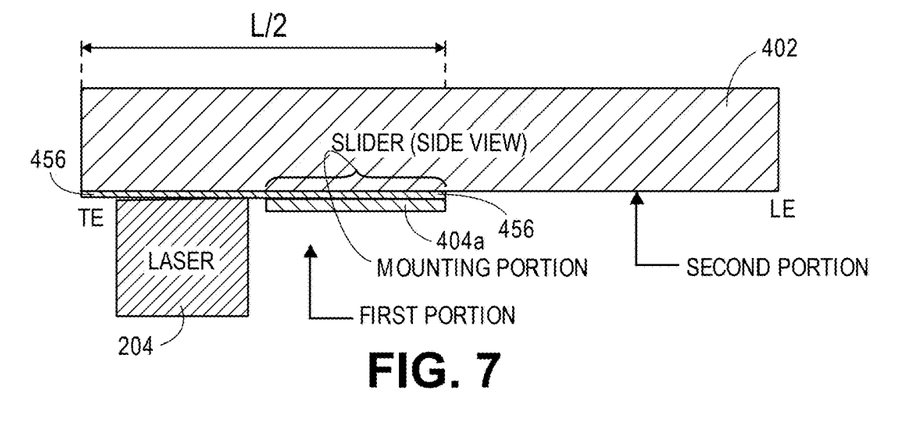
FIG. 7 is a side view illustrating a stable slider attachment for the enhanced slider-flexure assembly of FIG. 4B, according to an embodiment.

FIG. 7 is a side view illustrating a stable slider attachment for the enhanced slider-flexure assembly of FIG. 4B, according to an embodiment. In contrast with the ARC 406 of FIGS. 6C-6D, according to an embodiment an extended ARC application such as with ARC 456 coating a first portion of the suspension face of the slider 402, which extends at least to the farthest portion in the LE direction (i.e., the direction of or toward the LE face) of the standoff 404a of the flexure 404, enables a more stable attachment and more controlled bonding parallelism. According to a related embodiment, ARC 456 extends on the suspension face of the slider 402 substantially from the TE face and ending just beyond the standoff 404a. In any case, a second portion of the suspension face of the slider 402 body beyond the standoff 404a structure of the flexure 404 (in the direction toward the LE face) is not coated with the ARC 456, such that the second portion is a greater distance from the main planar body (see, e.g., main planar body 404m of FIG. 6B) of the flexure 404 than the first portion. Stated otherwise, a TE portion of the slider 402 corresponding to the TE portion of the suspension face is thicker than a LE portion of the slider 402 corresponding to the LE portion of the suspension face, due to the additional thickness corresponding to the applied ARC 456. Thus, undesirable contact between slider 402 and flexure 404 may be avoided, such as during microactuation sequences.

Method of Manufacturing a Hard Disk Drive Head Gimbal Assembly

Figure 8:
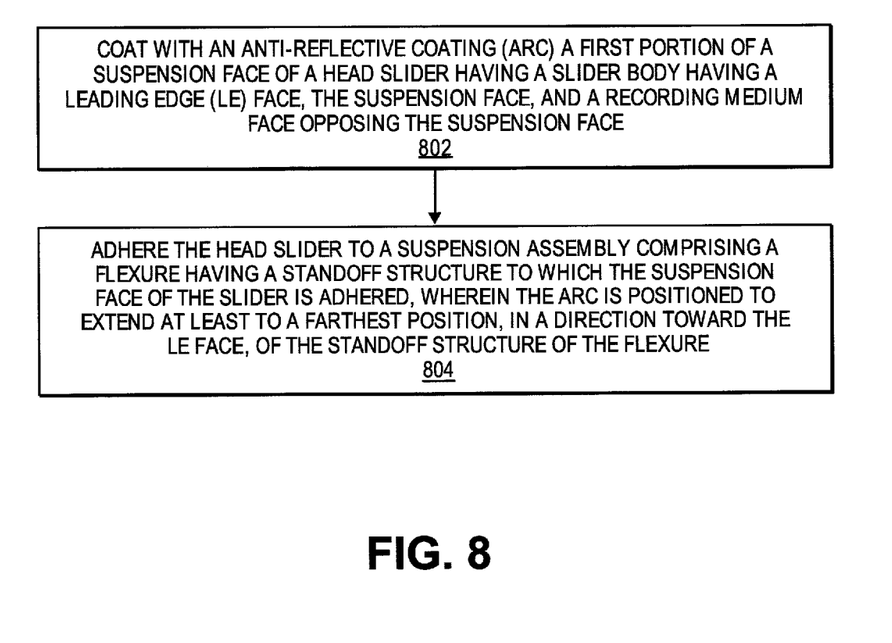
FIG. 8 is a flow diagram illustrating a method of manufacturing a hard disk drive head gimbal assembly, according to an embodiment.

FIG. 8 is a flow diagram illustrating a method of manufacturing a hard disk drive head gimbal assembly, according to an embodiment. A head gimbal assembly (HGA) produced according to the method of FIG. 8 is designed, configured, intended for implementation into a hard disk drive (HDD) (see, e.g., FIG. 1). For context, each individuated head slider has a slider body having what is referred to herein as a suspension face, a recording medium face opposing the suspension face, a leading edge (LE) face connecting the suspension face and the recording medium face, and houses a read-write transducer at or near a trailing edge (TE) face opposing the LE face and also connecting the suspension face and the recording medium face.

At block 802, coat with an anti-reflective coating (ARC) a first portion of the suspension face of the head slider. For example, a first portion (see, e.g., FIG. 7) of the slider 402 (FIGS. 4B, 6A-6B, 7) surface that faces the flexure (i.e., the suspension face), e.g., beginning from at or around the TE face, is coated with ARC 456 (FIGS. 4B, 7).

At block 804, adhere the head slider to a suspension assembly comprising a flexure having a standoff structure to which the suspension face of the slider is adhered, wherein the ARC is positioned to extend at least to a farthest portion, in a direction toward the LE face, of the standoff structure of the flexure. For example, head slider 402 is adhered to a suspension assembly comprising a flexure 404 (FIGS. 4B, 6A-6B, 7) having a standoff 404*a* (FIGS. 4B, 6A, 7) to which the suspension face of the slider 402 is adhered, wherein the ARC 456 is positioned to extend at least to a farthest portion, in a direction toward the LE face, of the standoff 404*a* of the flexure 404, e.g., such that the ARC 456 covers the entire portion of the slider 402 which physically interfaces with the standoff 404*a*. Thus, with such a configuration and positioning of ARC 456 on the suspension face of the slider 402, (i) better slider 402-flexure 404 bonding is enabled due to the heightened surface roughness of the ARC 456 as compared to the AlTiC slider body, (ii) better slider 402 stability is enabled by fully mating the ARC 456 with the standoff 404*a* by avoiding teetering at contact points, referred to elsewhere herein as (better) bonding parallelism control, and (iii) more clearance is enabled or provided due to the additional thickness of ARC 456 at the standoff 404*a*, thus enabling better rotatability of slider 402 about a gimbal dimple when being micro-actuated.

According to an embodiment, coating the first portion of the suspension face (block 802) includes coating the first portion substantially from the TE face to an end location immediately adjacent to where the standoff 404*a* of the flexure 404 is positioned. Further, according to an embodiment, coating the first portion includes not coating a second portion (see, e.g., FIG. 7) of the suspension face of the slider 404 beyond the end location of the first portion in the direction of the LE face, so that the second portion is a greater distance from a main planar body 404*m* (FIG. 6B) of the flexure 404 than the first portion.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. An assembly comprising:
    a head slider having a slider body having a leading edge (LE) face, a suspension face, and a recording medium face opposing the suspension face, wherein the slider houses a read-write transducer at or near a trailing edge (TE) face opposing the LE face of the slider body; and
    a suspension assembly comprising a flexure having an extending structure, extending from a main planar body of the flexure, to which the suspension face of the slider is adhered;
    wherein:
    a first portion of the suspension face of the slider body, the first portion extending to a farthest portion of the extending structure of the flexure in a direction of the LE face, is coated with an anti-reflective coating (ARC) extending to the farthest portion of the extending structure of the flexure and ending immediately adjacent the extending structure of the flexure for slider-flexure attachment parallelism; and
    a second portion of the suspension face of the slider body beyond the extending structure of the flexure in the direction of the LE face is not coated with the ARC such that the second portion is a greater distance from the main planar body of the flexure than the first portion such that contact between the slider and the main planar body of the flexure is inhibited during slider microactuation sequences.

2. The assembly of claim 1, wherein the ARC extends substantially from the TE face to immediately adjacent the extending structure of the flexure.

3. The assembly of claim 1, further comprising an adhesive attaching the slider to the extending structure of the flexure and interfacing in its entirety with a portion of the first portion of the suspension face of the slider body.

4. The assembly of claim 3, wherein the ARC has a surface roughness greater than the surface roughness of the slider body.

5. The assembly of claim 3, wherein the ARC is configured to physically interface with a majority of a mating surface of the extending structure of the flexure.

6. The assembly of claim 1, further comprising a heat-assisted magnetic recording (HAMR) chip-on-submount assembly (CoSA) comprising a submount with which a laser is coupled.

7. A hard disk drive comprising the assembly of claim 1.

8. A method of manufacturing a hard disk drive (HDD) head gimbal assembly (HGA), the method comprising:
    coating with an anti-reflective coating (ARC) a first portion of a suspension face of a head slider having a slider body having a leading edge (LE) face, the suspension face, and a recording medium face opposing the suspension face; and
    adhering the slider to a suspension assembly comprising a flexure having a standoff structure to which the suspension face of the slider is adhered;

wherein coating the first portion with the ARC includes:
positioning the ARC, for slider-flexure attachment parallelism, to extend to a farthest portion, in a direction toward the LE face, of the standoff structure of the flexure and to end at an end location immediately adjacent to where the standoff structure of the flexure is positioned; and not coating a second portion of the suspension face of the slider body beyond the end location of the first portion in the direction of the LE face so that the second portion is a greater distance from a main planar body of the flexure than the first portion such that contact between the slider and the main planar body of the flexure is inhibited during slider microactuation sequences.

9. The method of claim 8, wherein coating the first portion includes coating the first portion from the TE face to the end location.

10. The method of claim 8, wherein:
adhering the head slider includes applying an adhesive at a portion of the first portion of the suspension face; and
the ARC has a surface roughness greater than the surface roughness of the slider body.

11. An HDD HGA produced according to the method of claim 8.

12. An assembly comprising:
a head slider having a slider body having a suspension face and a recording medium face opposing the suspension face, wherein the slider houses a read-write transducer;
an anti-reflective coating (ARC) covering a first portion of the suspension face of the slider body for slider-flexure attachment parallelism, the first portion extending from a slider trailing edge (TE) face to a farthest portion of a mounting structure of a flexure of a suspension assembly to which the slider is coupled and ending immediately adjacent the mounting structure, wherein a second portion of the suspension face beyond the mounting structure is not covered with the ARC such that the second portion is a greater distance from a main planar body of the flexure than the first portion so that contact between the slider and the main planar body of the flexure is inhibited during slider microactuation sequences;
the suspension assembly comprising the flexure; and
an adhesive, attaching the slider to the flexure, positioned to interface in its entirety with at least a portion of the ARC.

13. The assembly of claim 12, wherein the ARC has a surface roughness greater than the surface roughness of the slider body.

* * * * *